United States Patent
Sirohey et al.

(10) Patent No.: US 8,406,488 B2
(45) Date of Patent: Mar. 26, 2013

(54) SYSTEMS, METHODS AND APPARATUS FOR PLAQUE VISUALIZATION AND QUANTIFICATION USING FUZZY AND ADAPTIVE REGION CLASSES

(75) Inventors: Saad Ahmed Sirohey, Pewaukee, WI (US); Gopal B. Avinash, New Berlin, WI (US); Sandeep Dutta, Waukesha, WI (US); John V. Skinner, New Berlin, WI (US); Patricia Le Nezet, Le Pecq (FR)

(73) Assignee: General Electric Company, Schenectady, NY (US)

( * ) Notice: Subject to any disclaimer, the term of this patent is extended or adjusted under 35 U.S.C. 154(b) by 1020 days.

(21) Appl. No.: 11/563,025

(22) Filed: Nov. 23, 2006

(65) Prior Publication Data
US 2008/0122842 A1      May 29, 2008

(51) Int. Cl.
*G06K 9/00*      (2006.01)
(52) U.S. Cl. ........................ 382/128; 382/130
(58) Field of Classification Search .................. 382/128, 382/131, 173, 132; 378/98.11
See application file for complete search history.

(56) References Cited

U.S. PATENT DOCUMENTS

| | | | |
|---|---|---|---|
| 8,077,939 B2 * | 12/2011 | Le Nezet et al. | 382/128 |
| 2004/0022359 A1 * | 2/2004 | Acharya et al. | 378/98.11 |
| 2004/0064029 A1 * | 4/2004 | Summers et al. | 600/407 |
| 2009/0136107 A1 * | 5/2009 | Arnold et al. | 382/131 |

OTHER PUBLICATIONS

Bartal et al., Vascular Interventional Hot Topic: CAD of Soft Cartoid Plaques on CTA, Radiological Society of North America Meeting Program, Nov. 30, 2004, Oak Brook, IL.
Rcadia Medical Imaging, Ltd., Smartheart, 2005.
Rcadia Medical Imaging, Ltd., Vulnerable Plaque Detection, 2005.
Tatsuyuki Yamauchi et al, The Impact of Visceral Fat on Multiple Risk Factors and Cartoid Atherosclerosis in Chronic Haemodialysis Patients, Nephrol Dial Transplant, 2003, 18: 1842-1847, Oxford Journals, 2003 European Renal Association-European Dialysis and Transplant Association.

* cited by examiner

*Primary Examiner* — Claire X Wang
(74) *Attorney, Agent, or Firm* — The Small Patent Law Group; Dean D. Small

(57) ABSTRACT

Systems, methods and apparatus are provided through which coronary plaque is classified in an image and visually displayed using an iterative adaptive process, such as an expectation maximization process.

17 Claims, 12 Drawing Sheets

SYSTEMS, METHODS AND APPARATUS FOR PLAQUE VISUALIZATION AND QUANTIFICATION USING FUZZY AND ADAPTIVE REGION CLASSES

FIELD OF THE INVENTION

This invention relates generally to healthcare image analysis, and more particularly to coronary plaque diagnosis.

BACKGROUND OF THE INVENTION

Cardiovascular related deaths constitute more than 500,000 deaths annually in the U.S. and many more death on a global scale. A significant portion of deaths related to cardiovascular problems are attributed to coronary artery disease. In coronary artery disease, the chief culprit is the build up of plaque, specifically soft-plaque, in the arteries. Accordingly, there is high interest in the medical community in detecting coronary artery disease.

Typically, soft-plaque is not easily detectable in X-ray images or non-contrasted computer tomography (CT) images. In comparison, calcified plaque is much more readily detectable than soft plaque and thus the presence of hard plaque has been used as a surrogate for the presence of soft plaque, with the reasoning being that calcified plaque is the by product of ruptured soft plaque.

Coronary plaque can be classified into six stages according to the Stary scale. According to general medical consensus, detecting the presence of plaque in stage 4 and stage 5 is very important because stages 4 and 5 constitute critical vulnerable plaque which could lead to rupture or dislodging of the plaque causing blockages, which in turn could lead to myocardial infarction (MCI), MCI being commonly known as "heart attack."

A conventional medical imaging technique for determining plaque and constituency of the plaque is intravascular ultrasound (IVUS). However IVUS is only performed on symptomatic patients due to the invasive nature of IVUS. Symptomatic patients are already at an advanced stage and past non-invasive therapy options.

With the advent of cardiac volume computed tomography (VCT) and the ever increasing spatial and temporal resolution of IVUS and with the impending advent of high definition (HD) VCT, imaging a contrasted study of heat that is gated to mitigate heart motion is within reasonable reach. Using IVUS images and HD VCT images, plaque can be distinguished from lumen and plaque can be distinguished from calcification. However distinguishing plaque from lumen and calcification is still very difficult in an automated manner.

For the reasons stated above, and for other reasons stated below which will become apparent to those skilled in the art upon reading and understanding the present specification, there is a need in the art for non-invasive detection of soft coronary plaque at stages earlier than stage 4 and stage 5. There is also a need for improved method of distinguishing plaque from lumen and distinguishing plaque from calcification in an automated manner.

BRIEF DESCRIPTION OF THE INVENTION

The above-mentioned shortcomings, disadvantages and problems are addressed herein, which will be understood by reading and studying the following specification.

In one aspect, a coronary vessel is imaged by accessing the coronary vessel volume in an image, adaptively segmenting the vessel volume in the image into a plurality of classes using an iterative adaptive process (such as an expectation maximization process), quantifying the total plaque burden by measuring the volume of all the different types of plaque, then visualizing the different classes (with their multitude of objects) using color blended display or volume rendering.

In another aspect, a method to image vessels includes accessing a coronary vessel volume in an image, segmenting adaptively the coronary vessel volume in the image into a plurality of classes in reference to data and/or acquisition driven iterative adaptive process, and quantifying plaque in the coronary vessel volume.

In yet another aspect, a method to classify coronary artery constituents includes classifying adaptively a plurality of coronary artery constituent classes and displaying the plurality of coronary artery constituent classes in reference to an iterative adaptive process.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, embodiments of methods are described. In the third section, a hardware and the operating environment in conjunction with which embodiments may be practiced are described. In the fourth section, particular implementations are described. Finally, in the fifth section, a conclusion of the detailed description is provided.

System Level Overview

Figure 1:
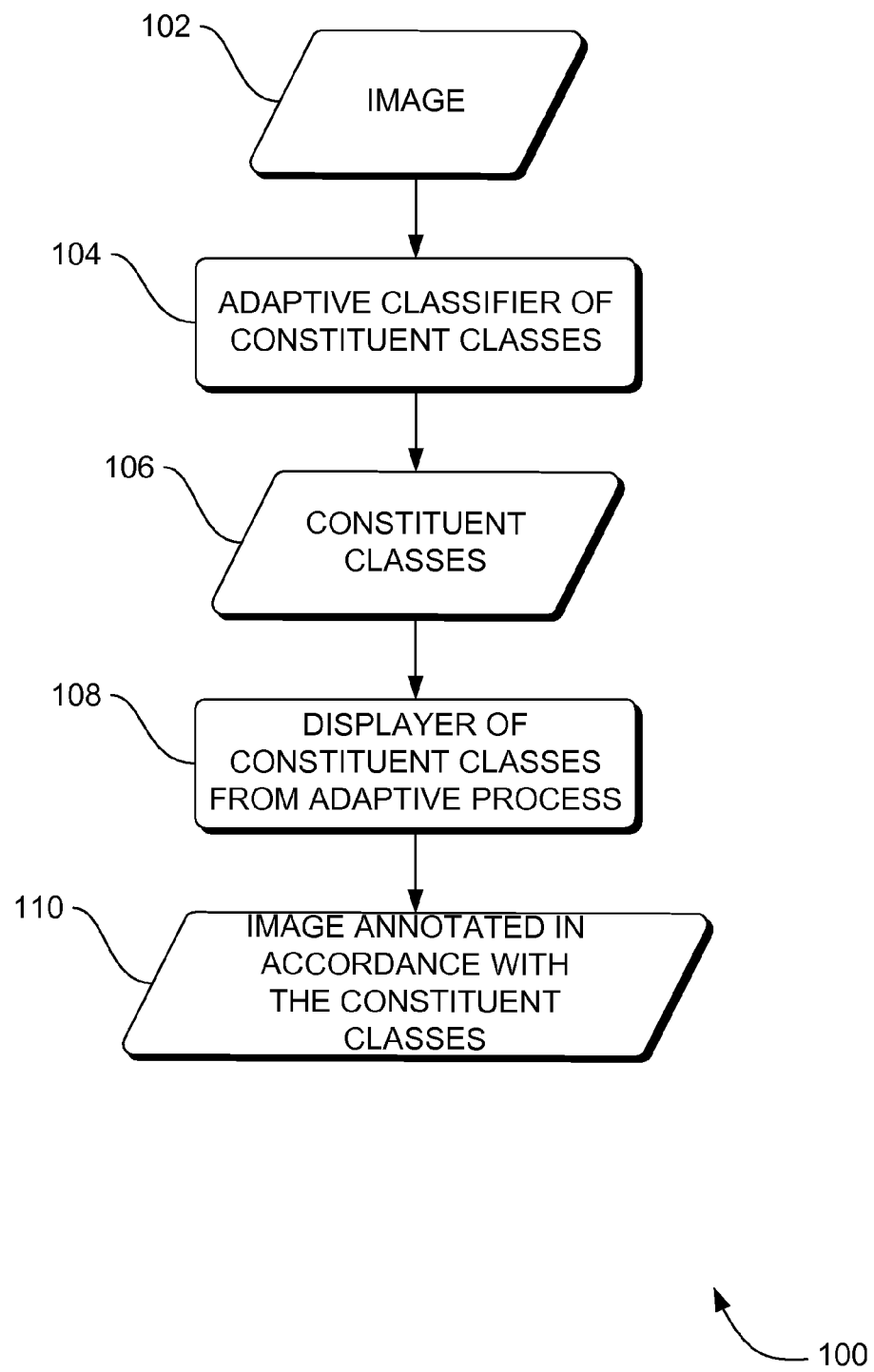
FIG. 1 is a block diagram of an overview of a system to classify coronary artery constituents.

FIG. 1 is a block diagram of an overview of a system 100 to classify coronary artery constituents. System 100 solves the need in the art for non-invasive detection of soft coronary plaque at stages earlier than stage 4 and stage 5 and solves the need in the art for an improved method of distinguishing plaque from lumen and distinguishing plaque from calcification in an automated manner.

System 100 includes an iterative adaptive classifier 104 of a plurality of coronary artery constituent classes 106 in an image 102. In some embodiments, the iterative adaptive process that is implemented by the classifier 104 is an expectation maximization process.

Some embodiments of system 100 also include a visual displayer 108 of the plurality of coronary artery constituent classes 106. The visual displayer 108 displays an image 110 that is annotated in accordance with the coronary artery constituent classes 106. The annotation in the image 110 distinguishes soft coronary plaque at stages earlier than stage 4 and stage 5 and distinguishes plaque from lumen and also distinguishes plaque from calcification While the system 100 is not limited to any particular iterative adaptive process, image 102, iterative adaptive classifier 104, coronary artery constituent classes 106, visual displayer 108 and annotated image 110, for sake of clarity a simplified iterative adaptive process, image 102, iterative adaptive classifier 104, coronary artery constituent classes 106, visual displayer 108 and annotated image 110 are described.

The system level overview of the operation of an embodiment is described above in this section of the detailed description. Some embodiments operate in a multi-processing, multi-threaded operating environment on a computer, such as computer 1102 in FIG. 11.

Method Embodiments

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 200-900 are performed by a program executing on, or performed by firmware or hardware that is a part of, a computer, such as computer 1102 in FIG. 11.

Figure 2:
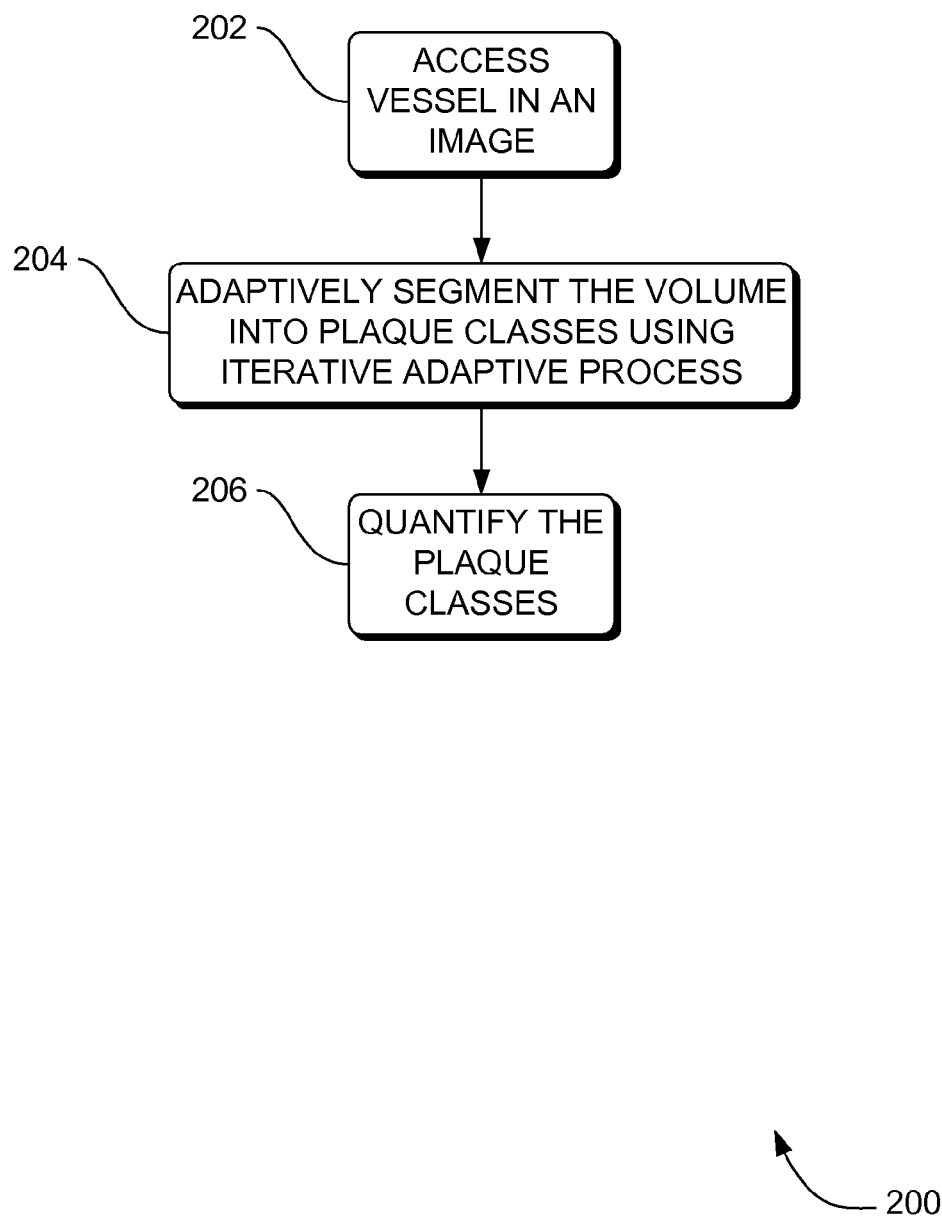
FIG. 2 is a flowchart of a method to image vessel, according to an embodiment.

FIG. 2 is a flowchart of a method 200 to image vessel, according to an embodiment. Method 200 solves the need in the art for non-invasive detection of soft coronary plaque at stages earlier than stage 4 and stage 5 and solves the need in the art for an improved method of distinguishing plaque from lumen and distinguishing plaque from calcification in an automated manner.

Figure 3:
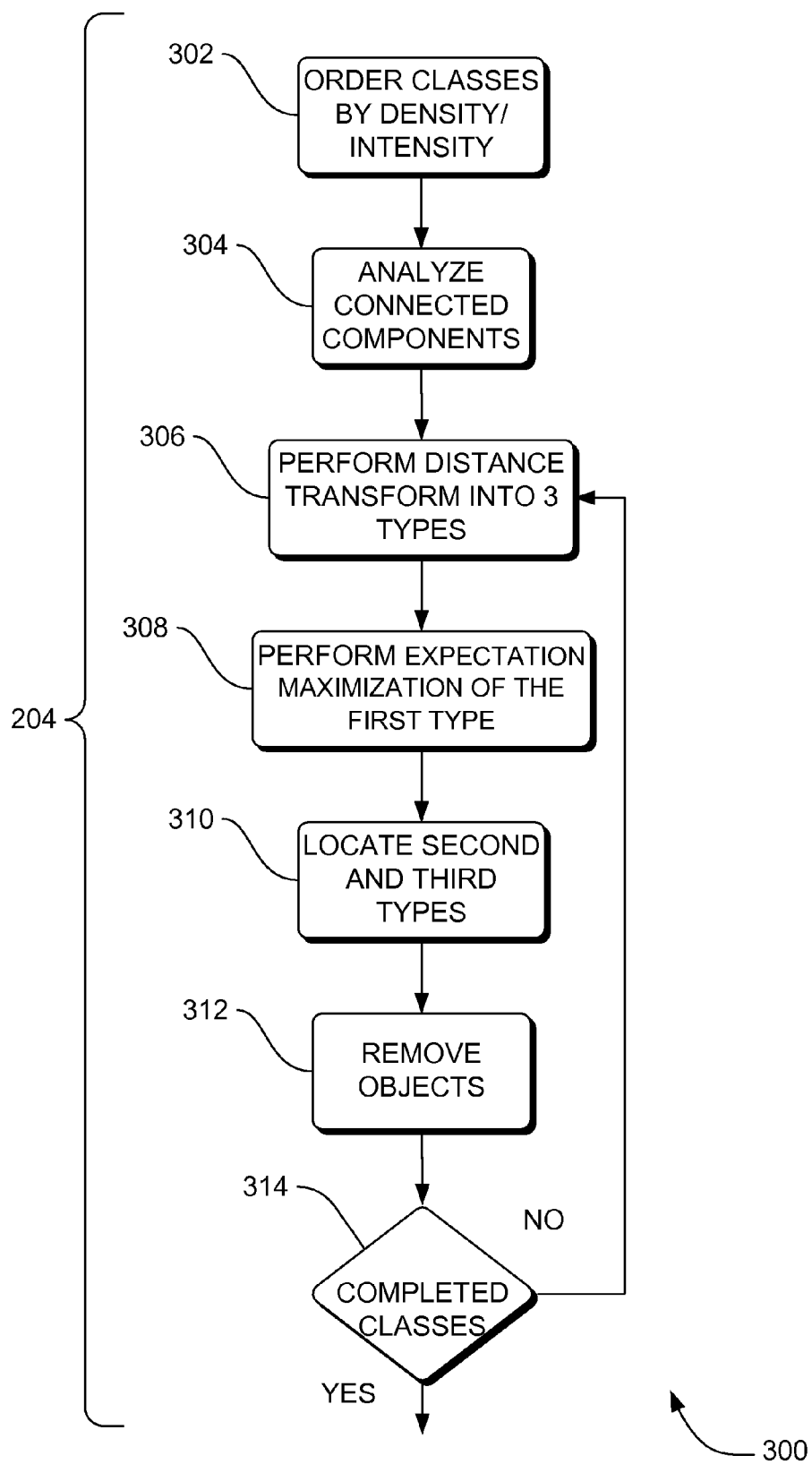
FIG. 3 is a flowchart of a method to adaptively segment the coronary vessel volume, according to an embodiment.
Figure 4:
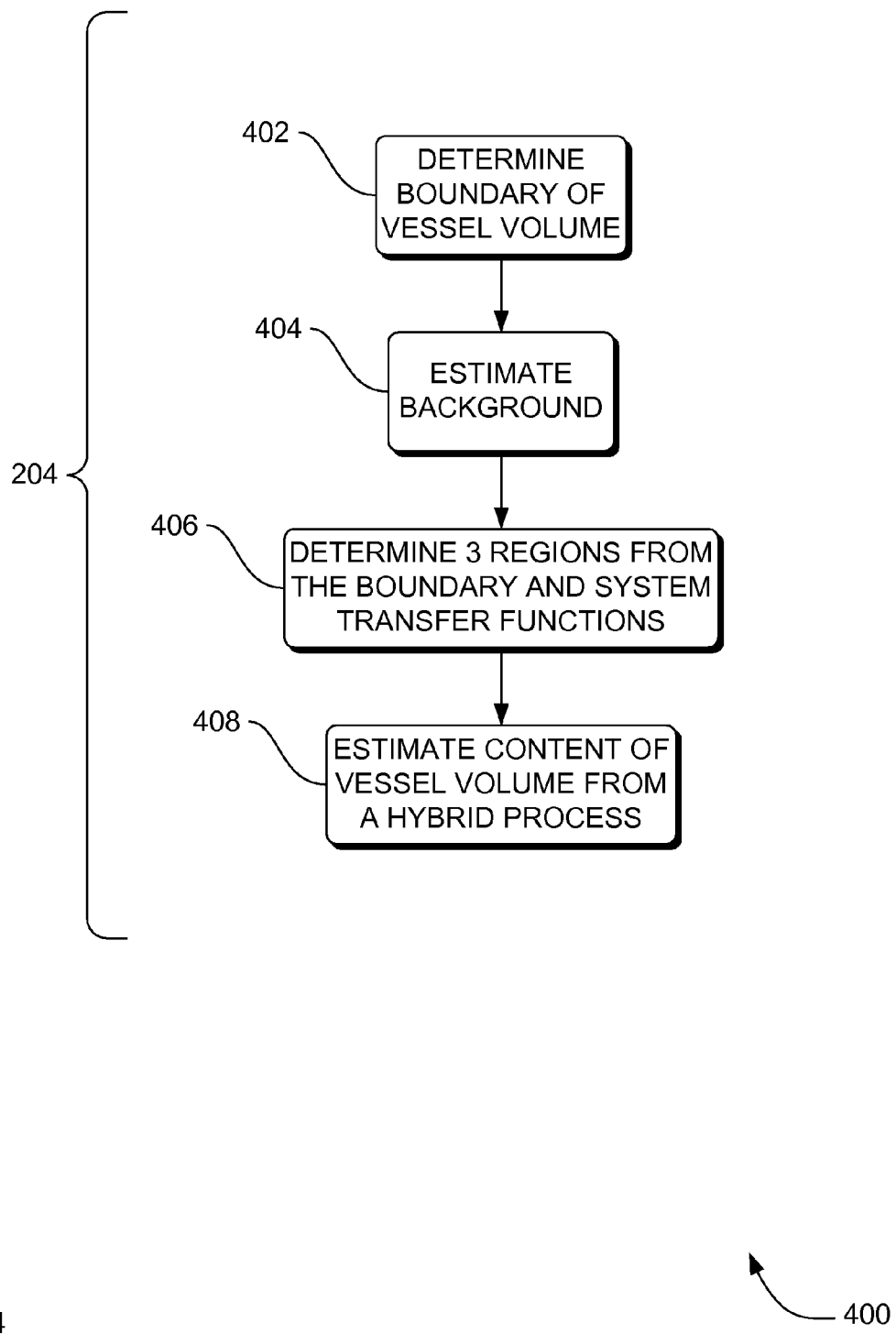
FIG. 4 is a flowchart of a method to adaptively segment the coronary vessel volume, according to an embodiment.

Method 200 includes accessing 202 a coronary vessel volume in an image, such as image 102. Method 200 also includes segmenting 204 adaptively the coronary vessel volume in the image into a plurality of classes in reference to data and/or acquisition driven iterative adaptive process. One embodiment of adaptively segmenting 204 the coronary vessel volume is shown in FIG. 3 and FIG. 4 below. In some embodiments, the iterative adaptive process is an expectation maximization process. Method 200 also includes quantifying 206 plaque in the coronary vessel volume. One embodiment of quantifying 206 plaque in the coronary vessel volume is method 500 below.

FIG. 3 is a flowchart of a method 300 to adaptively segment the coronary vessel volume, according to an embodiment. Method 300 is one embodiment of adaptively segmenting 204 the coronary vessel volume in the image.

Some embodiments of method 300 include ordering 302 the plurality of classes in a descending order. The classes are order in reference to density/intensity of the plurality of classes.

Some embodiments of method 300 include analyzing 304 connected-components in the image, such as image 102 in FIG. 1.

For each class, the remainder of method 300 is repeated or iterated.

Some embodiments of method 300 include performing 306 distance transformation on threshold volume in the image into three types; a first type, and a second type and a third type. The three types are determined by a combination of the overall size (in terms of volume) and the thickness, in relationship with the system resolution. A first type relates to a large size and thick object, a second type refers to a small size object (with sub types of thin and thick) and a third type refers to a large but thin object.

Some embodiments of method 300 include performing 308 system resolution specific expectation maximization-adaptive threshold-based segmentation for all connected-components of the first type.

Some embodiments of method 300 include identifying 310 a location in the image of the second type and the third type.

Some embodiments of method 300 include removing 312 all objects of the second and the third type and all processed first type from the coronary vessel volume in the image.

Some embodiments of method 300 include iterating 314 the performing action 306 and 308, the identifying action 310 and the removing action 312 for each class.

FIG. 4 is a flowchart of a method 400 to adaptively segment the coronary vessel volume, according to an embodiment. Method 400 is one embodiment of adaptively segmenting 204 the coronary vessel volume in the image.

Some embodiments of method 400 include determining 402 'a boundary of the object of the first type.

Some embodiments of method 400 include estimating 404 the background outside of exclusion regions by determining the mean value of the immediate neighborhood of the object of the first type.

Some embodiments of method 400 include determining 406 three regions for the object of the first type in reference to the boundary and the system transfer functions.

Some embodiments of method 400 include estimating 408 the contents of the object of the first type using a weighted quantification process. The contents include mass and volume, the mass is calculated by using a weighted combination of the transition region with a full contribution of the foreground region all with respect with the background region.

Figure 5:
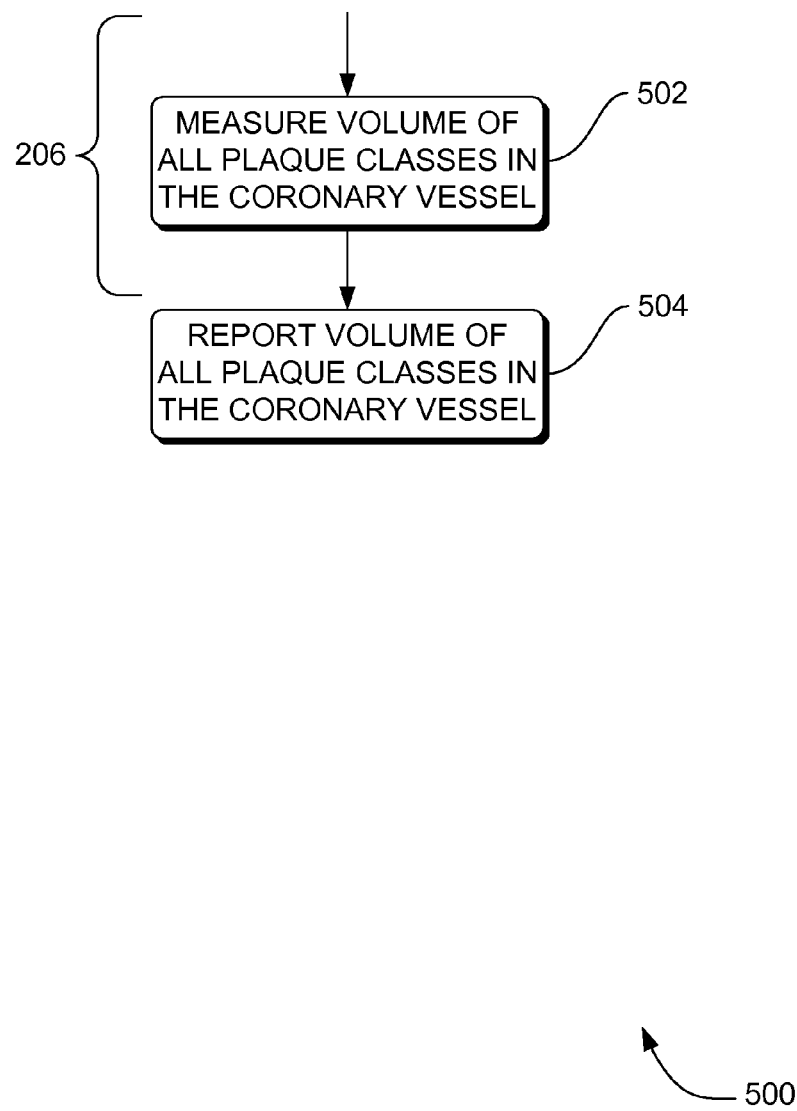
FIG. 5 is a flowchart of a method of quantifying plaque in the coronary vessel volume, according to an embodiment.

FIG. 5 is a flowchart of a method 500 of quantifying plaque in the coronary vessel volume, according to an embodiment. Method 500 is one embodiment of quantifying 206 plaque in the coronary vessel volume in FIG. 2.

Some embodiment of method 500 includes measuring 502 the volume of all the different classes of plaque that are present in the coronary vessel volume.

Some embodiment of method 500 includes generating 504 a report that describes the volume of all the different classes of plaque that are present in the coronary vessel volume.

Figure 6:
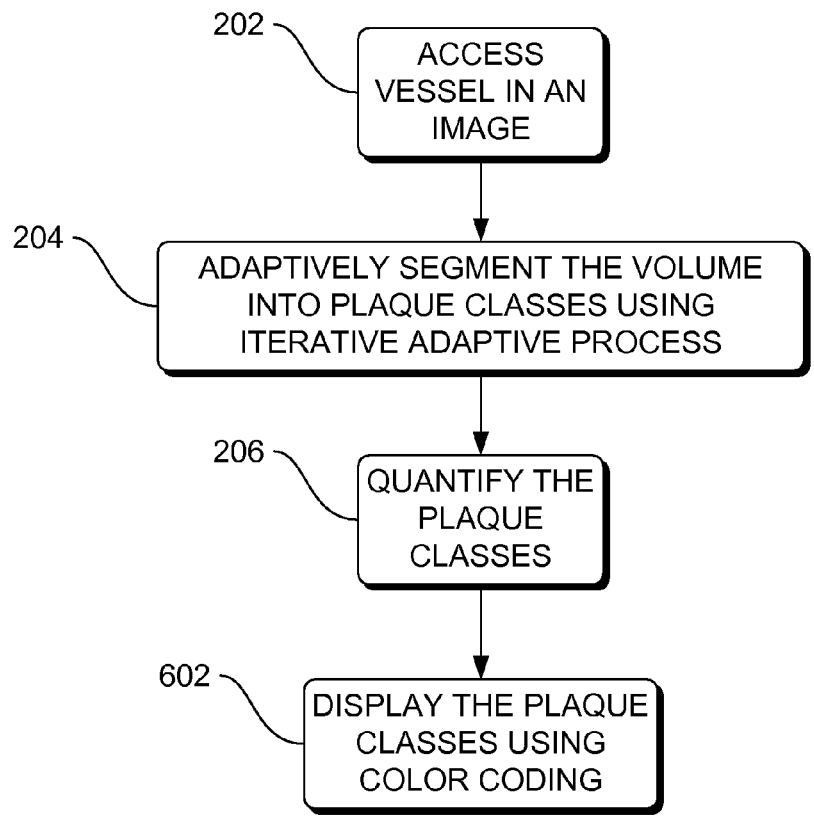
FIG. 6 is a flowchart of a method to image vessel, according to an embodiment.

FIG. 6 is a flowchart of a method 600 to image vessel, according to an embodiment. Method 600 solves the need in the art for non-invasive detection of soft coronary plaque at stages earlier than stage 4 and stage 5 and solves the need in the art for an improved method of distinguishing plaque from lumen and distinguishing plaque from calcification in an automated manner.

Method 600 includes accessing 202 a coronary vessel volume in an image, such as image 102. Method 600 also includes segmenting 204 adaptively the coronary vessel volume in the image into a plurality of classes in reference to data and/or acquisition driven iterative adaptive process. One embodiment of adaptively segmenting 204 the coronary vessel volume is shown in FIG. 3 and FIG. 4 above. In some embodiments, the iterative adaptive process is an expectation maximization process. Method 600 also includes quantifying 206 plaque in the coronary vessel volume. One embodiment of quantifying 206 plaque in the coronary vessel volume is method 500 above.

Method 600 also includes displaying 602 the plurality of classes using a color blended display or volume rendering.

Figure 7:
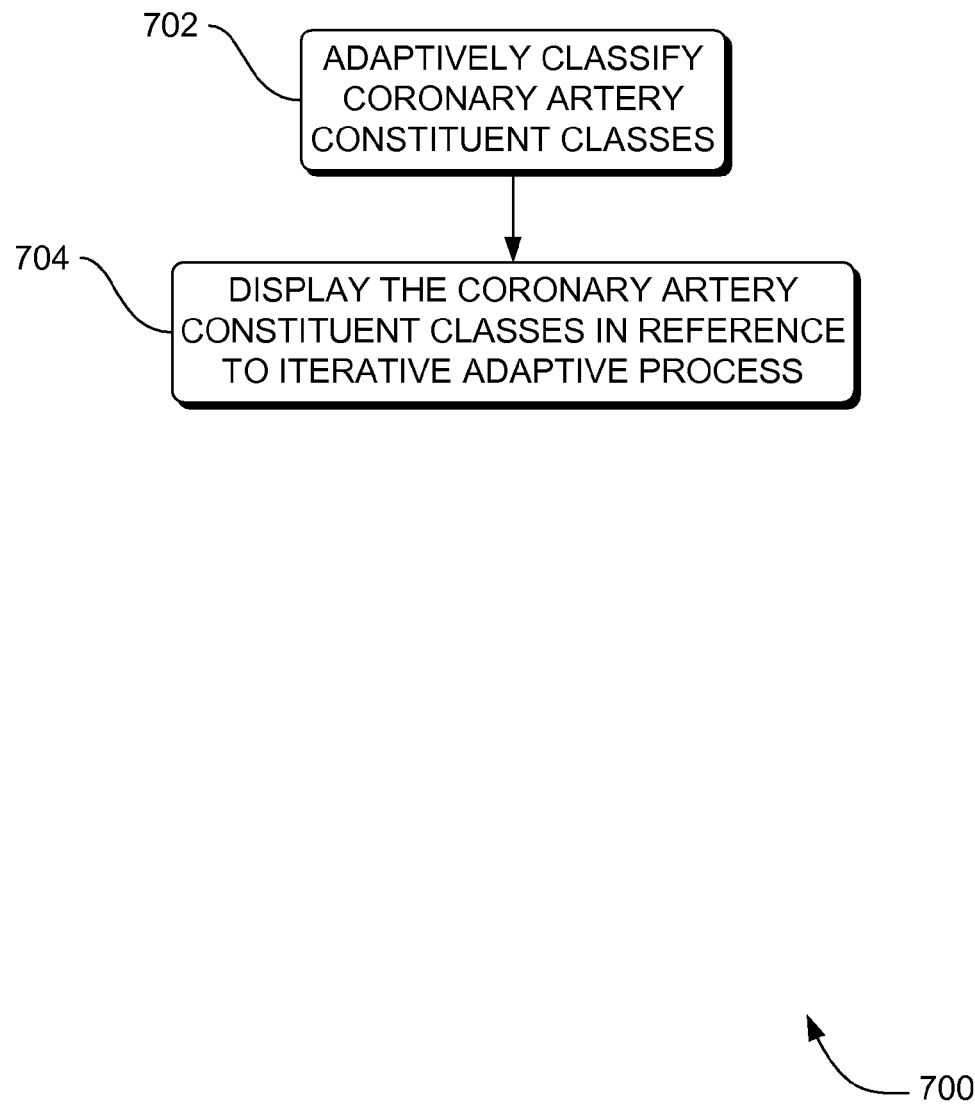
FIG. 7 is a flowchart of a method to classify coronary artery constituents, according to an embodiment.

FIG. 7 is a flowchart of a method 700 to classify coronary artery constituents, according to an embodiment. Method 700 solves the need in the art for non-invasive detection of soft coronary plaque at stages earlier than stage 4 and stage 5 and solves the need in the art for an improved method of distinguishing plaque from lumen and distinguishing plaque from calcification in an automated manner.

Method 700 includes adaptively classifying 702 a plurality of coronary artery constituent classes. Method 700 includes also includes displaying 704 the plurality of coronary artery constituent classes in reference to an iterative adaptive process. In some embodiments, the iterative adaptive process is an expectation maximization process.

Figure 8:
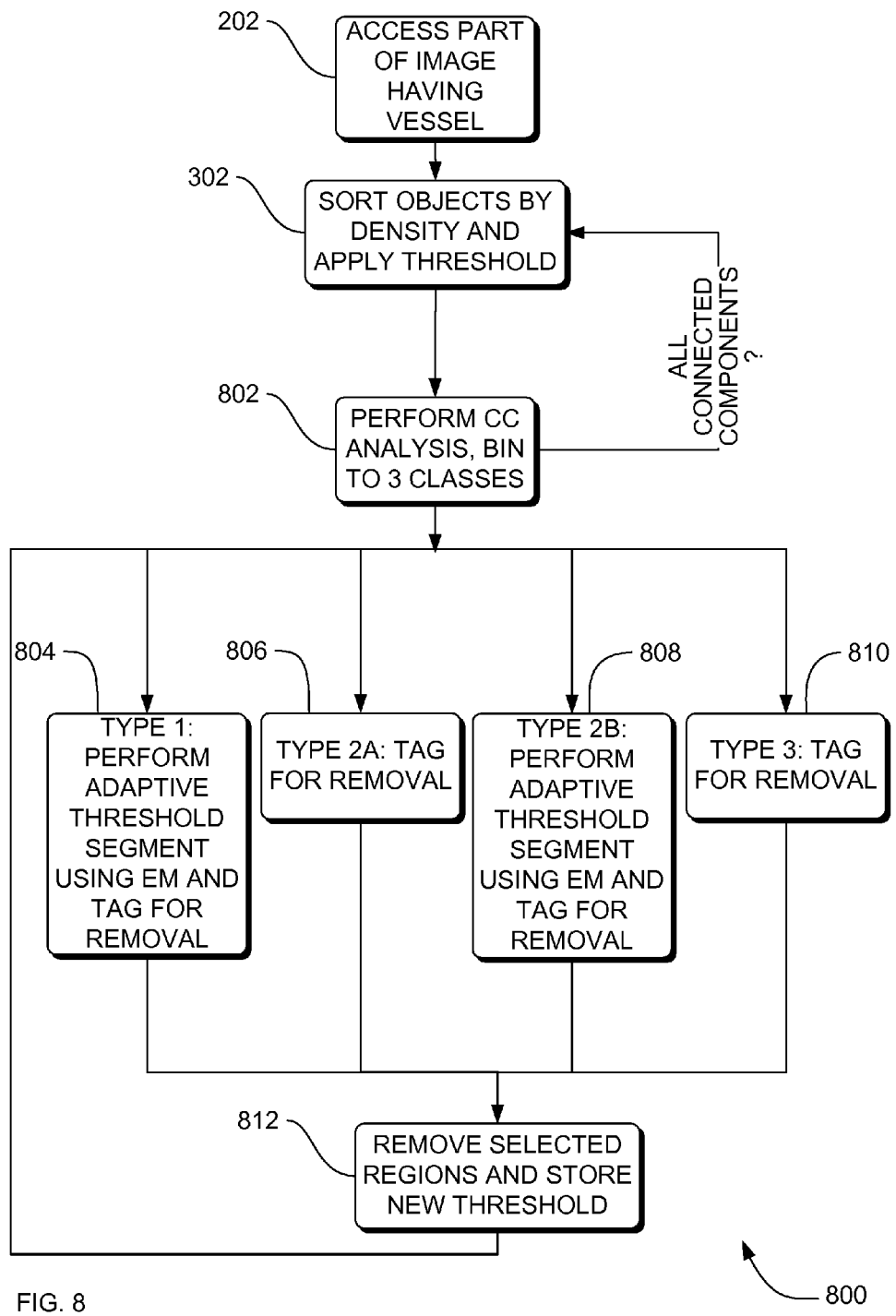
FIG. 8 is a flowchart of a method to classify coronary artery constituents using three classes, according to an embodiment.

FIG. 8 is a flowchart of a method 800 to classify coronary artery constituents using three types, according to an embodiment. Method 800 solves the need in the art for non-invasive detection of soft coronary plaque at stages earlier than stage 4 and stage 5 and solves the need in the art for an improved method of distinguishing plaque from lumen and distinguishing plaque from calcification in an automated manner.

Some embodiments of method 800 include accessing 202 a coronary vessel volume in an image, such as image 102.

Some embodiments of method 800 include ordering 302 the plurality of classes in a descending order. The classes are ordered in reference to density/intensity of the plurality of classes. The ordering 302 also includes applying an initial threshold using a-priori knowledge.

Some embodiments of method 800 include performing 802 connected-component (CC) analysis on the thresholded volume and binning the connected-component into three classes.

Action 302 and 802 are repeated for all connected-components in all discrete density objects.

For all connected-components in type 1, the type 1 connected-component is pruned 804 using opening operations if thin structures are connected to type 1 connected-component. In addition, adaptive thresholding segmentation is performed on all type 1 connected-components based using an expectation maximization algorithm, and the type 1 connected-components are targeted or tagged for removal from the volume. Type 1 connected-components are large and thick connected-components in both number of voxels as well as thickness from Euclidean distance being greater then 2 times system resolution.

For all connected-components in type 2A, the connected-components are targeted or tagged 806 for removal from the volume. Type 2A connected-components are small connected-component s based on the number of voxels and having a Euclidean distance less than twice the system resolution.

For all connected-components in type 2B, adaptive thresholding segmentation 808 is performed based using an expectation maximization algorithm, and then the type 2B connected-components are targeted or tagged for removal from the volume. Type 2B connected-component s are small connected-components based on the number of voxels and having Euclidean distance greater than twice the system resolution For all connected-components in type 3, the CCs are targeted or tagged 810 for removal from the volume. Type 3 CCs are large thin structures in which the number of voxels is large but the maximum Euclidean distance is less than twice system resolution.

Some embodiments of method 800 include removing 812 the targeted/tagged/selected regions from the volume and storing the new threshold value/values for the object type Actions 804-812 are performed for each CC.

Figure 9:
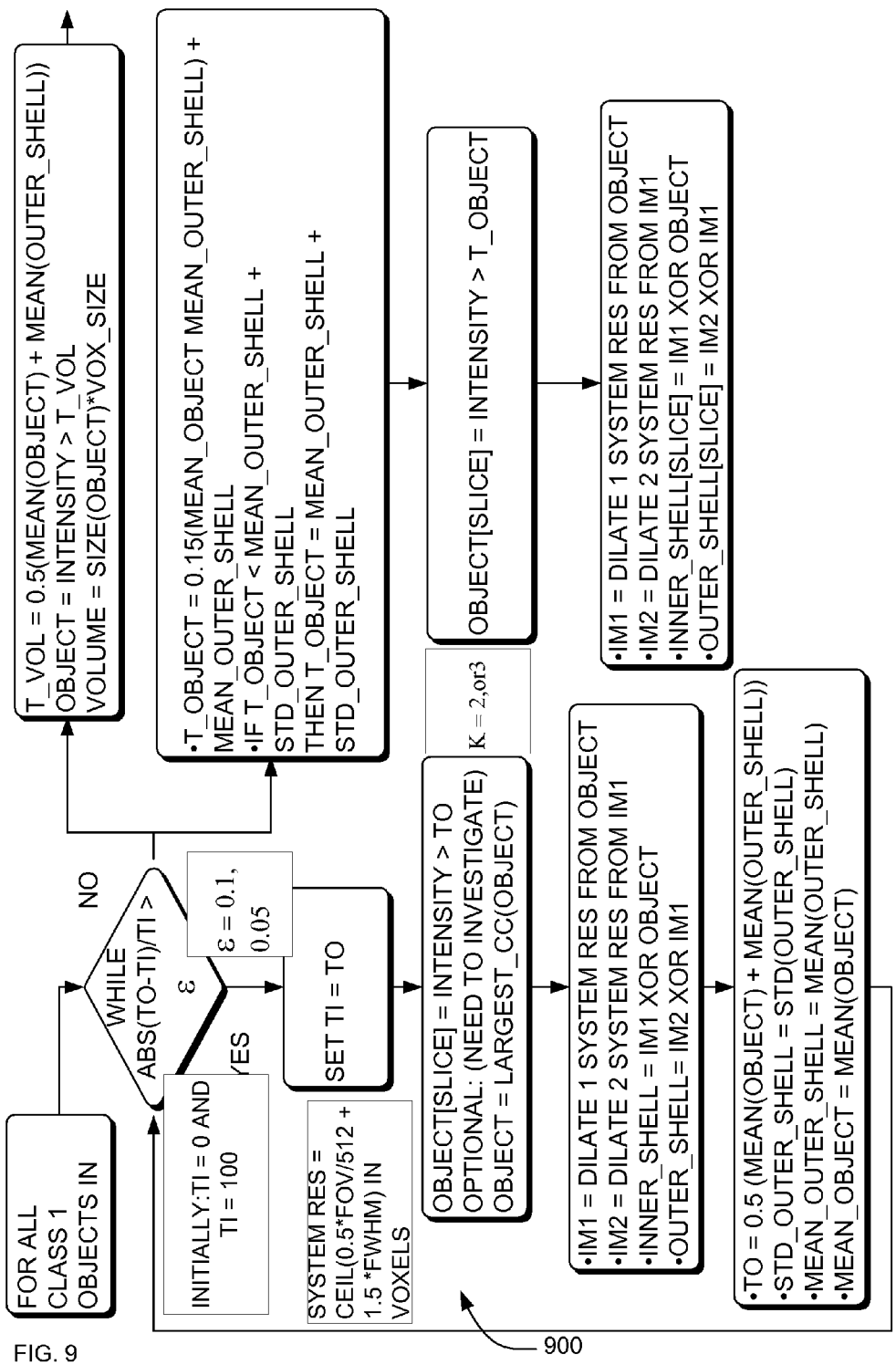
FIG. 9 is a flowchart of a method to classify coronary artery constituents using three classes, according to an embodiment.

FIG. 9 is a flowchart of a method 900 to classify coronary artery constituents using three classes, according to an embodiment. Method 900 solves the need in the art for non-invasive detection of soft coronary plaque at stages earlier than stage 4 and stage 5 and solves the need in the art for an improved method of distinguishing plaque from lumen and distinguishing plaque from calcification in an automated manner.

Method 900, is an expectation maximization process which is based on the assumption that an object will comprise of interior region, partial volume due to system resolution, and exterior region (at a lower density value due to the hierarchical algorithm logic. This algorithm identifies the correct threshold value to be at the 50% point for every object and then calculates the objects mass and volume for quantification values.

The expectation maximization process is described in FIG. 2 for all Class 1 objects at a particular threshold value, this algorithm uses the CT system resolution.

In computed tomography (CT) system transfer, the definition in the appendix is for an ideal system without any signal corruption or introduction of noise but it does provide the basis of the partial volume effect which is further composed of the CT system response. However the CT imaging can be modeled as a system shown in FIG. 12 below.

The expectation maximization process then looks at the region outside the system resolution region and computes the mean of that "background". Based on the two mean values it estimates a new 50% threshold value and compares it with the original threshold value, if there is a difference greater than a predetermined error tolerance it uses the new threshold value as the initial and repeats the procedure, which is described in detail in FIG. 9.

Once the correct threshold values are determined the hybrid quantification algorithm calculates the mass and the volume of the objects of interest.

Density "D", mass "m" are proportional quantities and related through Volume "V". The CT imaging produces a voxel value that is the average density of the unit volume defined by the size of the voxel. The density of the voxel is determined by filtered back projections of multiple rays that indicate the amount of absorbed photons in that unit volume.

As a simplification the effect of multiple wavelengths will not be considered nor any other approximations in the reconstruction algorithm (however, the recon filter, the FOV and the slice thickness are considered). The voxel value is the average density of the volume of the voxel (which may be dx, dy and dz from FOV and slice thickness), which in turn is related to the mass in that volume. Putting it simply in the ideal sense the Hounsfield unit of a voxel is proportional to the mass contained in it. If this unit volume is occupied by say a metal then it's very dense and it will absorb most of the photons of the rays passing through it giving it a high HU. If the unit volume is composed of a mixture of two elements i.e. calcium and water then it will absorb photons in proportion to the mixture. The unit voxel is shown herein.

It should be noted that exclusion voxels should be excluded from all calculations:

$$Mass\_object = C * Vox\_size * size(Object) * (mean(Object) - mean(Outer\_shell))\#\#$$

$$Mass\_inner\_shell = C *\_size * size(Inner\_shell) * (mean(Inner\_shell) - mean(Outer\_shell))$$

$$Mass\_corrected = Mass\_object + Mass\_inner\_shell;$$

Use either Mass_object or Mass_corrected

Figure 10:
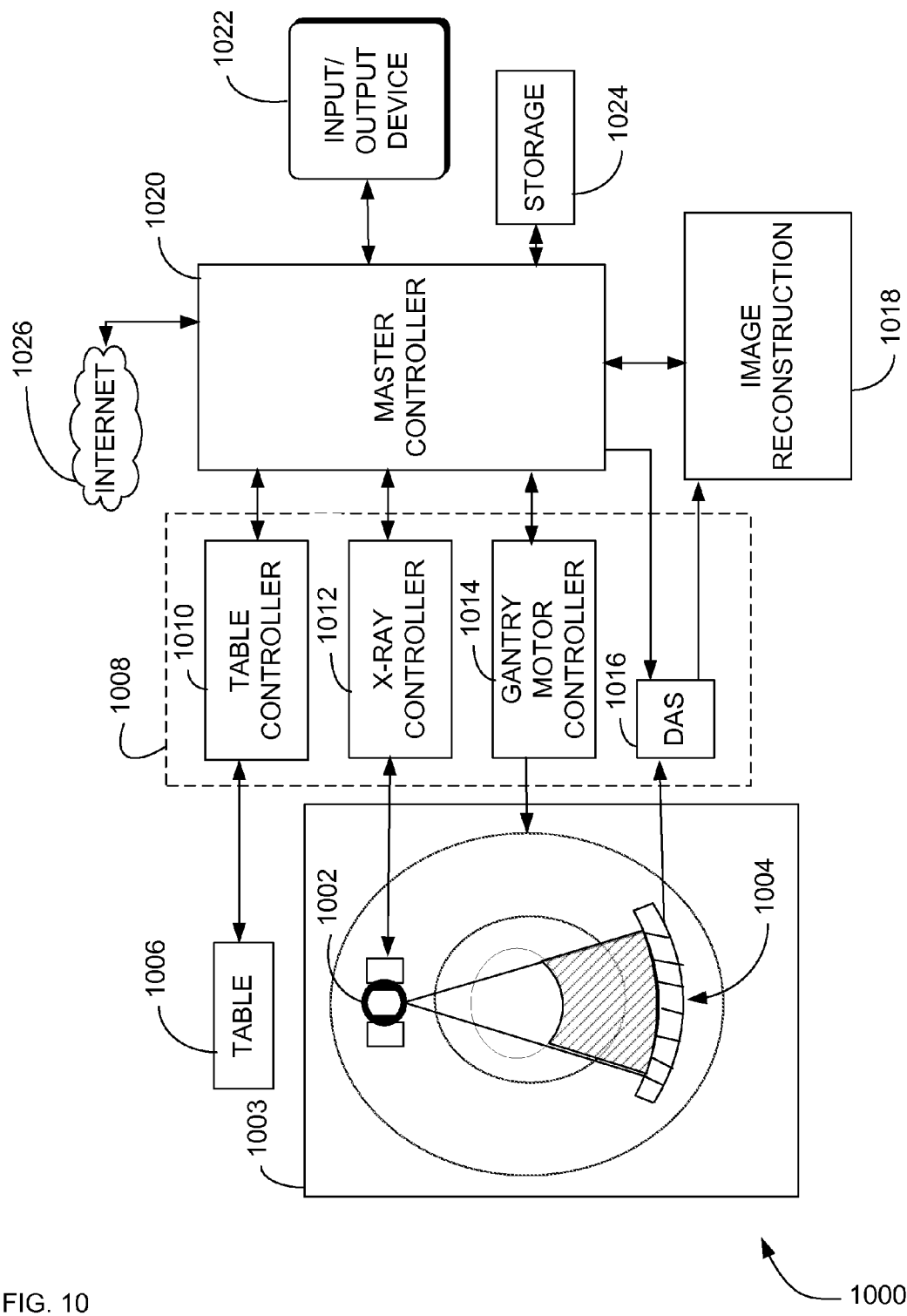
FIG. 10 is a block diagram of a computed tomography imaging system to image coronary arteries.

FIG. 10 is a block diagram of a computed tomography (CT) imaging system 1000 to image coronary arteries.

Computed tomography (CT) imaging system 1000 includes a gantry 1003, table 1006, controllers 1008, master controller, and image reconstruction device 1018. It should be noted that other data acquisition systems are envisioned including a magnetic resonance (MRI) imaging system, a positron emission tomography (PET) system, a single photon emission computed tomography (SPECT) system, an ultrasound system, or an X-ray system. The data acquisition system obtains data including, but not limited to image data, functional image data, and temporal image data. Further examples of data include voxel data including volume information for a three dimensional region of interest (ROI), pixel data including area information for a two dimensional region of interest, and spatio-temporal data. Spatio-temporal data includes area or volume information over a selected, predetermined time period.

CT imaging system 1000 includes a gantry 1003 having an X-ray source 1002, a radiation detector array 1004, a patient support structure and a patient cavity, wherein the X-ray source 1002 and the radiation detector array 1004 are diametrically disposed so as to be separated by the patient cavity. In an exemplary embodiment, a patient (not shown) is disposed upon the patient support structure, which is then disposed within the patient cavity. The X-ray source 1002 projects an X-ray beam toward the radiation detector array 1004 so as to pass through the patient. In an exemplary embodiment, the X-ray beam is collimated by a collimate (not shown) so as to lie within an X-Y plane of a Cartesian coordinate system referred known to those in the art as the imaging plane. After passing through and becoming attenuated by the patient, the attenuated X-ray beam is received by the radiation detector array 1004. In preferred embodiment, the radiation detector array 1004 includes a plurality of detector elements wherein each of said detector elements receives an attenuated X-ray beam and produces an electrical signal responsive to the intensity of the attenuated X-ray beam.

In addition, the X-ray source 1002 and the radiation detector array 1004 can rotate relative to the gantry 1003 and the patient support structure, so as to allow the X-ray source 1002 and the radiation detector array 1004 to rotate around the patient support structure when the patient support structure is disposed within the patient cavity. X-ray projection data is obtained by rotating the X-ray source 1002 and the radiation detector array 1004 around the patient during a scan. The X-ray source 1002 and the radiation detector array 1004 communicate with a control mechanism 1008 associated with the CT imaging system 1000. The control mechanism 1008 controls the rotation and operation of the X-ray source 1002 and the radiation detector array 1004.

The table controller 1010, X-Ray controller, gantry motor controller, DAS 1016, image reconstruction 1018, and master controller 1020 have the same hardware and capabilities that is only limited by the programming in each respective device. For the purpose of the description, all controllers are presumed to have the same hardware so a discussion to one applies to all. The master controller 1020 provides computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

The master controller 1020 includes a processor, commercially available from Intel, Motorola, Cyrix and others. Master controller 1020 also includes random-access memory (RAM), read-only memory (ROM), and one or more mass storage devices 1024, and a system bus that operatively couples various system components to the processing unit of master controller 1020. The memory and mass storage devices are types of computer-accessible media. Mass storage devices are more specifically types of nonvolatile computer-accessible media and can include one or more hard disk drives, floppy disk drives, optical disk drives, and tape cartridge drives. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory. The processor in the master controller executes computer programs stored on the computer-accessible media.

Master controller 1020 can be communicatively connected to the Internet 1026 via a communication device. Internet 1026 connectivity is well known within the art. In one embodiment, a communication device is a modem that responds to communication drivers to connect to the Internet via what is known in the art as a "dial-up connection." In another embodiment, a communication device is an Ethernet® or similar hardware network card connected to a local-area network (LAN) that itself is connected to the Internet via what is known in the art as a "direct connection" (e.g., T1 line, etc.).

A user enters commands and information into the master controller 1020 through input device 1022 such as a keyboard or a pointing device. The keyboard permits entry of textual information into master controller 1020, as known within the art, and embodiments are not limited to any particular type of keyboard. Pointing device permits the control of the screen pointer provided by a graphical user interface (GUI) of operating systems such as versions of Microsoft Windows™. Embodiments are not limited to any particular pointing device. Such pointing devices include mice, touch pads, trackballs, remote controls and point sticks. Other input devices (not shown) can include a microphone, joystick, game pad, satellite dish, scanner, or the like. For the purpose of this description, a keyboard and a pointing device are referred to as a user interface (UI) that allows the user to interact with the automated calcium detection system, algorithm, or structure. The output device is a display device. Display device is connected to the system bus. Display device permits the display of information, including computer, video and other information, for viewing by a user of the computer. Embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). The controllers also include an operating system (not shown) that is stored on the computer-accessible media RAM, ROM, and mass storage device 1024, and is and executed by the processor in the controller. Examples of operating systems include Microsoft Windows®, Apple MacOS®, Linux®, UNIX®. Examples are not limited to any particular operating system, however, and the construction and use of such operating systems are well known within the art.

Master controller 1020 can be operated using at least one operating system to provide a graphical user interface (GUI) including a user-controllable pointer. Master controller can have at least one web browser application program executing within at least one operating system, to permit users of the controller to access intranet or Internet world-wide-web pages as addressed by Universal Resource Locator (URL) addresses. Examples of browser application programs include Netscape Navigator® and Microsoft Internet Explorer In an exemplary embodiment, the control mechanism 1008 includes an X-ray controller 1012 communicating with an X-ray source 1002, a gantry motor controller 1014, and a data acquisition system (DAS) 1016 communicating with a radiation detector array 1004. The X-ray controller 1012 provides power and timing signals to the X-ray source 1002, the gantry motor controller 1014 controls the rotational speed and angular position of the X-ray source 1002, and the radiation detector array 1004 and the DAS 1016 receive the electrical signal data produced by detector elements 1004 and convert this data into digital signals for subsequent processing. In an exemplary embodiment, the CT imaging system 1000 also includes an image reconstruction device 1018, a data storage device 1024 and a master controller 1020, wherein the processing device 1020 communicates with the image reconstruction device 1018, the gantry motor controller 1014, the X-ray controller 1012, the data storage device 1024, an input and an output device 1022. The CT imaging system 1000 can also include a table controller 1010 in communication with the master controller 1020 and the patient support structure, so as to control the position of the patient support structure relative to the patient cavity.

In accordance with the preferred embodiment, the patient is disposed on the patient support structure, which is then positioned by an operator via the master controller 1020 so as to be disposed within the patient cavity. The gantry motor controller 1014 is operated via master controller 1020 so as to cause the X-ray source 4 and the radiation detector array 6 to rotate relative to the patient. The X-ray controller 1012 is operated via the master controller 1020 so as to cause the X-ray source 1002 to emit and project a collimated X-ray beam toward the radiation detector array 1004 and hence toward the patient. The X-ray beam passes through the patient so as to create an attenuated X-ray beam, which is received by the radiation detector array 1004.

The detector elements 1004 receive the attenuated X-ray beam, produce electrical signal data responsive to the intensity of the attenuated X-ray beam and communicate this electrical signal data to the DAS 1016. The DAS 1016 then converts this electrical signal data to digital signals and communicates both the digital signals and the electrical signal data to the image reconstruction device 1018, which performs high-speed image reconstruction. This information is then communicated to the master controller 1020, which stores the image in the data storage device 1024 and displays the digital signal as an image via output device 1022. The information communicated to the master controller 1020 is referred to as ROI image data. In accordance with an exemplary embodiment, the output device 1022 includes a display screen having a plurality of discrete pixel elements.

Figure 11:
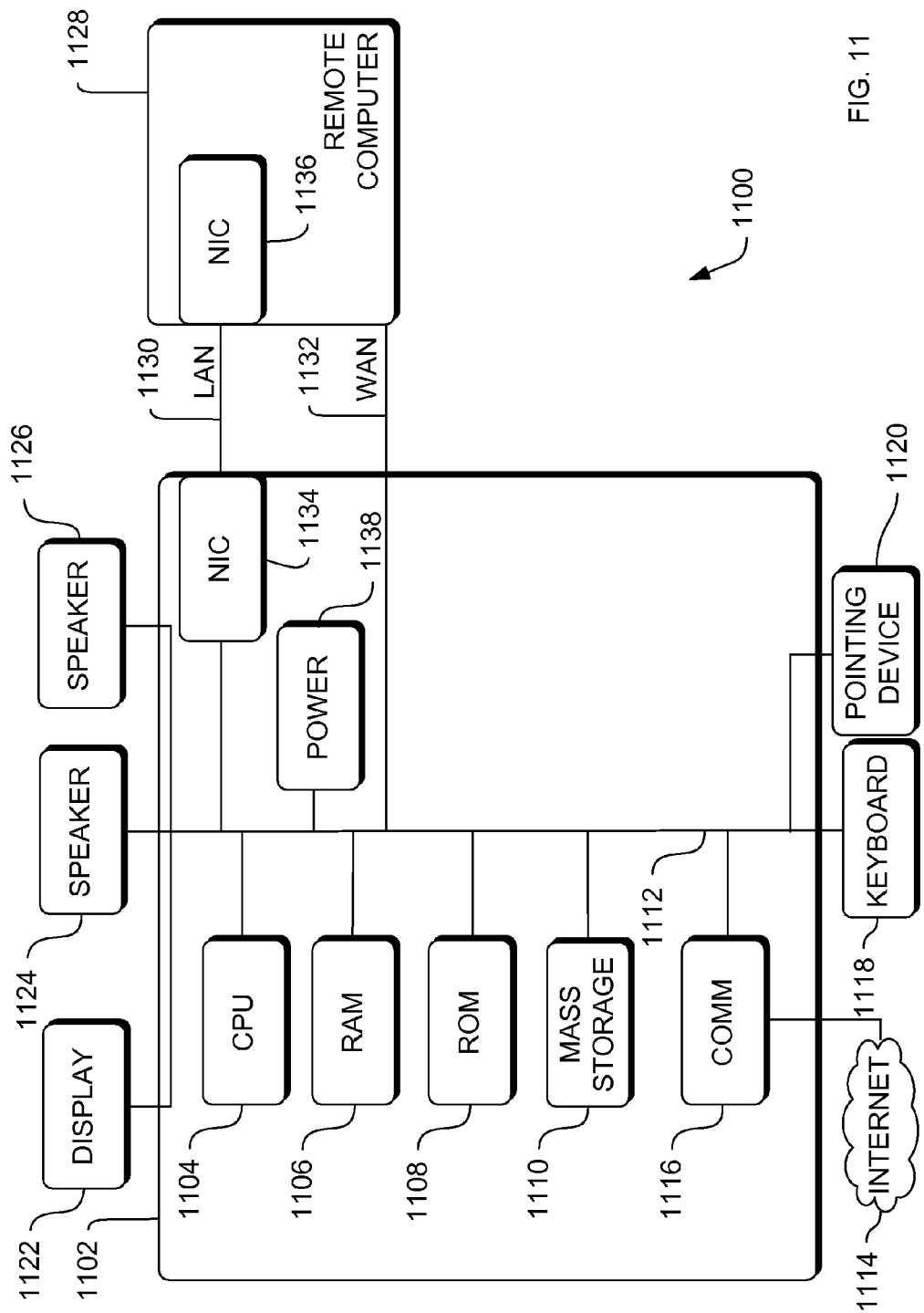
FIG. 11 is a block diagram of a hardware and operating environment in which different embodiments can be practiced.

In some embodiments, methods 200-900 are implemented as a computer data signal embodied in a carrier wave, that represents a sequence of instructions which, when executed by a processor, such as processor 1104 in FIG. 11, cause the processor to perform the respective method. In other embodiments, methods 200-1100 are implemented as a computer-accessible medium having executable instructions capable of directing a processor, such as processor 1104 in FIG. 11, to perform the respective method. In varying embodiments, the medium is a magnetic medium, an electronic medium, or an optical medium.

Hardware and Operating Environment

FIG. 11 is a block diagram of a hardware and operating environment 1100 in which different embodiments can be practiced. The description of FIG. 11 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 1102 includes a processor 1104, commercially available from Intel, Motorola, Cyrix and others. Computer 1102 also includes random-access memory (RAM) 1106, read-only memory (ROM) 1108, and one or more mass storage devices 1110, and a system bus 1112, that operatively couples various system components to the processing unit 1104. The memory 1106, 1108, and mass storage devices, 1110, are types of computer-accessible media. Mass storage devices 1110 are more specifically types of nonvolatile computer-accessible media and can include one or more hard disk drives, floppy disk drives, optical disk drives, and tape cartridge drives. The processor 1104 executes computer programs stored on the computer-accessible media.

Computer 1102 can be communicatively connected to the Internet 1114 via a communication device 1116. Internet 1114 connectivity is well known within the art. In one embodiment, a communication device 1116 is a modem that responds to communication drivers to connect to the Internet via what is known in the art as a "dial-up connection." In another embodiment, a communication device 1116 is an Ethernet® or similar hardware network card connected to a local-area network (LAN) that itself is connected to the Internet via what is known in the art as a "direct connection" (e.g., T1 line, etc.).

A user enters commands and information into the computer 1102 through input devices such as a keyboard 1118 or a pointing device 1120. The keyboard 1118 permits entry of textual information into computer 1102, as known within the art, and embodiments are not limited to any particular type of keyboard. Pointing device 1120 permits the control of the screen pointer provided by a graphical user interface (GUI) of operating systems such as versions of Microsoft Windows®. Embodiments are not limited to any particular pointing device 1120. Such pointing devices include mice, touch pads, trackballs, remote controls and point sticks. Other input devices (not shown) can include a microphone, joystick, game pad, satellite dish, scanner, or the like.

In some embodiments, computer 1102 is operatively coupled to a display device 1122. Display device 1122 is connected to the system bus 1112. Display device 1122 permits the display of information, including computer, video and other information, for viewing by a user of the computer. Embodiments are not limited to any particular display device 1122. Such display devices include cathode ray tube (CRT) displays (monitors), as well as flat panel displays such as liquid crystal displays (LCD's). In addition to a monitor, computers typically include other peripheral input/output devices such as printers (not shown). Speakers 1124 and 1126 provide audio output of signals. Speakers 1124 and 1126 are also connected to the system bus 1112.

Computer 1102 also includes an operating system (not shown) that is stored on the computer-accessible media RAM 1106, ROM 1108, and mass storage device 1110, and is executed by the processor 1104. Examples of operating systems include Microsoft Windows®, Apple MacOS®, Linux®, UNIX®. Examples are not limited to any particular operating system, however, and the construction and use of such operating systems are well known within the art.

Embodiments of computer 1102 are not limited to any type of computer 1102. In varying embodiments, computer 1102 comprises a PC-compatible computer, a MacOS®-compatible computer, a Linux®-compatible computer, or a UNIX®-compatible computer. The construction and operation of such computers are well known within the art.

Computer 1102 can be operated using at least one operating system to provide a graphical user interface (GUI) including a user-controllable pointer. Computer 1102 can have at least one web browser application program executing within at least one operating system, to permit users of computer 1102 to access an intranet, extranet or Internet world-wide-web pages as addressed by Universal Resource Locator (URL) addresses. Examples of browser application programs include Netscape Navigator® and Microsoft Internet Explorer®.

The computer 1102 can operate in a networked environment using logical connections to one or more remote computers, such as remote computer 1128. These logical connections are achieved by a communication device coupled to, or a part of, the computer 1102. Embodiments are not limited to a particular type of communications device. The remote computer 1128 can be another computer, a server, a router, a network PC, a client, a peer device or other common network node. The logical connections depicted in FIG. 11 include a local-area network (LAN) 1130 and a wide-area network (WAN) 1132. Such networking environments are commonplace in offices, enterprise-wide computer networks, intranets, extranets and the Internet.

When used in a LAN-networking environment, the computer 1102 and remote computer 1128 are connected to the local network 1130 through network interfaces or adapters 1134, which is one type of communications device 1116. Remote computer 1128 also includes a network device 1136. When used in a conventional WAN-networking environment, the computer 1102 and remote computer 1128 communicate with a WAN 1132 through modems (not shown). The modem, which can be internal or external, is connected to the system bus 1112. In a networked environment, program modules depicted relative to the computer 1102, or portions thereof, can be stored in the remote computer 1128.

Computer 1102 also includes power supply 1138. Each power supply can be a battery.

Implementation

Figure 12:
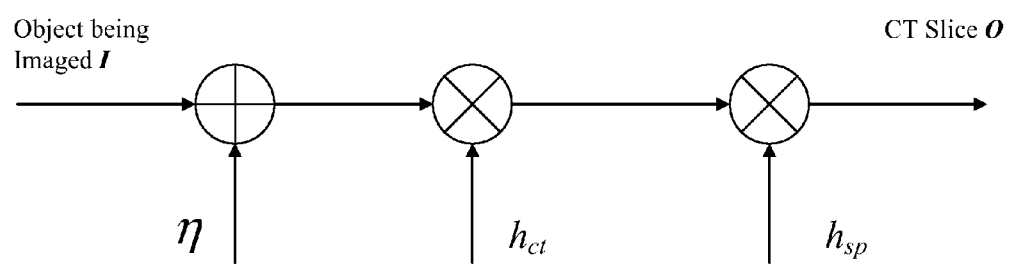
FIG. 12 is diagram of CT system resolution transfer function, according to an embodiment.

FIG. 12 is diagram of CT system resolution transfer function 1200, according to an embodiment. In FIG. 12, η represents the additive photonic noise, $h_{ct}$ represents the CT reconstruction transfer function, $h_{sp}$ represents the effective transfer function for partial volume, and ⓧ represents convolution. The expectation maximization process assumes that the mean of the initial thresholded object is correct.

Apparatus components can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 1102 in FIG. 11, or on at least as many computers as there are components.

Conclusion

A coronary plaque imaging system is described. A technical effect of the system is visual classification of different classes of coronary plaque. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all imaging, object-oriented, database and communication environments and alternate technologies which provide the same functionality as described herein.

We claim:

1. A non-transitory computer-accessible medium having executable instructions to image vessels, the executable instructions capable of directing a processor to perform:
    accessing a coronary vessel volume in an image;
    segmenting hierarchically the coronary vessel volume in the image into a plurality of classes, the plurality of classes being constituent classes of the coronary vessel volume, each class having a plurality of objects;
    classifying each of the plurality of objects in the plurality of classes into a plurality of types determined by an overall size and a thickness, in relationship with a system resolution, by performing distance transformation on a threshold volume;
    segmenting objects of least one of a plurality of types using an iterative adaptive process; and
    quantifying plaque in the coronary vessel volume.

2. The computer-accessible medium of claim 1 wherein the plurality of types further comprises:
    a first type, a second type and a third type.

3. The method of claim 2,
    wherein the first type further comprises:
    large and thick connected-components in both number of voxels as well as thickness from Euclidean distance, being greater than 2 times system resolution,
    wherein the second type further comprises:
    small connected-components based on the number of voxels and Euclidean distance less than twice the system resolution; and
    small connected-components based on the number of voxels and Euclidean distance greater than twice the system resolution,
    wherein the third type further comprises:
    large thin structures based on a large number of voxels and Euclidean distance less than twice the system resolution.

4. The computer-accessible medium of claim 1, wherein the iterative adaptive process further comprises:
    an expectation maximization process.

5. The computer-accessible medium of claim 1 wherein accessing a coronary vessel volume is based on data acquired from injection of contrast material into the patient.

6. The computer-accessible medium of claim 1, wherein the executable instructions capable of directing the processor to quantify plaque in the coronary vessel volume further comprise executable instructions capable of directing the processor to perform:
    measuring the volume of all the different classes of plaque that are present in the coronary vessel volume.

7. The computer-accessible medium of claim 6, the medium further comprising executable instructions capable of directing the processor to perform:
    generating a report that describes the volume of all the different classes of plaque that are present in the coronary vessel volume.

8. The computer-accessible medium of claim 1, the medium further comprising executable instructions capable of directing the processor to perform:
    displaying the plurality of classes using a color blended display or volume rendering.

9. The computer-accessible medium of claim 1, wherein the plurality of classes further comprises:
    at least three classes.

10. The computer-accessible medium of claim 9, wherein the at least three classes further comprises calcified plaque, contrasted lumen, and soft plaque.

11. The computer-accessible medium of claim 1, wherein the executable instructions capable of directing the processor to adaptively segment the coronary vessel volume in the image into a plurality of classes further comprise executable instructions capable of directing the processor to perform:
    ordering the plurality of classes in a descending order in reference to density/intensity of the plurality of classes;
    analyzing connected-components in the image;
    performing the distance transformation on the threshold volume into a first type, and a second type and a third type;
    performing system resolution specific expectation maximization-adaptive threshold-based segmentation for all connected-components of the first type;
    identifying location of the second type and the third type;
    removing all objects of the second and the third type and all processed first type from the coronary vessel volume; and
    iterating the performing, identifying and removing for each class.

12. The computer-accessible medium of claim 11,
    wherein the first type further comprises:
    large and thick connected-components in both number of voxels as well as thickness from Euclidean distance, being greater than 2 times system resolution,
    wherein the second type further comprises:
    small connected-components based on the number of voxels and Euclidean distance less than twice the system resolution; and
    small connected-components based on the number of voxels and Euclidean distance greater than twice the system resolution,
    wherein the third type further comprises:
    large thin structures based on a large number of voxels and Euclidean distance less than twice the system resolution.

13. The computer-accessible medium of claim 11, wherein the executable instructions capable of directing the processor to adaptively segment the object of the first type in the image further comprise executable instructions capable of directing the processor to perform:
    determining a boundary of the object of the first type;
    estimating the background excluding exclusion regions by determining the mean value of the immediate neighborhood of the object of the first type;
    determining three regions for the object of the first type in reference to the boundary and the system transfer functions; and estimating the contents of the object of the first type using a weighted quantification process; wherein the contents includes mass and volume.

14. The computer-accessible medium of claim 13 wherein the three regions of the object further comprise:
an interior region, a transition region and a background region.

15. The computer-accessible medium of claim 14, wherein the weighted quantification process uses all of the interior region and a weighted combination of the transition region with respect to the background region.

16. The computer-accessible medium of claim 1, further comprising executable instructions capable of directing the processor to perform:
detecting soft coronary plaque at a stage earlier than stage 4 based on the quantifying by distinguishing plaque from a lumen and plaque from a calcification.

17. The computer-accessible medium of claim 1, wherein the classes are not defined by physical regions.

* * * * *